United States Patent [19]
Campbell et al.

[11] Patent Number: 6,020,407
[45] Date of Patent: Feb. 1, 2000

[54] SUPER DISPERSABLE THICKENING COMPOSITION FOR AQUEOUS SYSTEMS AND A METHOD OF THICKENING SAID AQUEOUS SYSTEMS

[75] Inventors: Barbara A. Campbell, Bristol, Pa.; Joseph G. Doolan, Hightstown; Charles A. Cody, Robbinsville, both of N.J.; Wilbur Mardis, Southampton, Pa.

[73] Assignee: Rheox, Inc., Hightstown, N.J.

[21] Appl. No.: 08/554,885

[22] Filed: Nov. 7, 1995

[51] Int. Cl.$^7$ .............................. C08K 5/41; C08K 5/42; B01F 3/00
[52] U.S. Cl. ......................... 524/156; 524/157; 524/158; 524/198; 524/507; 524/591; 252/363.5
[58] Field of Search ................. 524/1, 156, 157, 524/916, 158, 198, 507, 591; 252/363.5, 315.01, 315.1; 106/199; 526/932; 516/102

[56] References Cited

U.S. PATENT DOCUMENTS

| | | | |
|---|---|---|---|
| 3,037,952 | 6/1962 | Jordan, Jr. et al. | 524/501 |
| 4,079,028 | 3/1978 | Emmons et al. | 524/507 |
| 4,155,892 | 5/1979 | Emmons et al. | 524/507 |
| 4,180,491 | 12/1979 | Kim et al. | 524/317 |
| 5,023,309 | 6/1991 | Kruse et al. | 528/49 |
| 5,376,709 | 12/1994 | Lau et al. | 524/48 |
| 5,425,806 | 6/1995 | Doolan et al. | 106/203 |

FOREIGN PATENT DOCUMENTS

| | | | |
|---|---|---|---|
| 926532 | 5/1973 | Canada | 252/363.5 |

OTHER PUBLICATIONS

Schmolka, "Applications of Pluronic Polyols in the Cosmetic Industry", Amer. Perfumer and Cosmetics, vol. 82, No. 7, pp. 25–30, Jul. 1967.

Schmolka, "A Review of Block Polymer Surfactants", J. Amer. Chem. Society, vol. 54, pp. 110–116, Mar. 1977.

*Primary Examiner*—Richard D. Lovering
*Assistant Examiner*—Daniel S. Metzmaier
*Attorney, Agent, or Firm*—Michael J. Cronin

[57] ABSTRACT

An improved thickening composition for aqueous systems including latex paints and coatings is described. The substantially anhydrous composition comprises in specified ratios a solid thickener polymer, and one or more surfactants. The solid thickener polymer includes associative thickeners. Associative thickener polymers include polyurethanes, polyesters, polyacrylamides, modified hydroxyethyl celluloses, alkali soluble emulsions and other chemicals. Specific surfactants utilized include dialkyl sulfosuccinates, alkyl sulfates, alpha olefin sulfonates and sulfates of ethoxylated alcohols.

9 Claims, No Drawings

SUPER DISPERSABLE THICKENING COMPOSITION FOR AQUEOUS SYSTEMS AND A METHOD OF THICKENING SAID AQUEOUS SYSTEMS

BACKGROUND OF THE INVENTION

1. Brief Description of the Invention

The invention described herein involves improved thickening compositions, often referred to as rheological additives, viscosity modifiers or thixotropes, used to impart Theological and viscosity modification properties to a wide range of aqueous or water-based systems. In many commercial applications, a thickening chemical such as a polyurethane polymer is added to an aqueous system, for example latex paint, to change or modify the Theological properties of the system.

Rheological additives of a solid powder type have proved difficult to mix or disperse into most aqueous systems. Dispersing these products into latex paints and coatings and other water-based systems is particularly burdensome. In view of this difficulty, such solid additives have been disfavored, and have not reached or approached their full market potential. To avoid dispersibility problems, some manufacturers have mixed their polymeric powder with water and volatile organic liquids so as to produce a flowable liquid Theological product, which can then be poured into aqueous paints, inks and coatings. Environmental concerns, however, have recently made the use of such volatile organic liquids less acceptable, and these liquid thickener compositions have themselves become disfavored. In addition, the use of water and organic liquids, which provide no active rheological properties, increases the weight and bulk of the thickening products which adds substantially to shipping, transportation and packaging costs. Liquid products require expensive non-leakable containers and the added cost of transportation, especially when exporting products, has proved troublesome.

The present invention involves the discovery that a substantially anhydrous mixture or blend of a surfactant, preferrably in powdered form, together with a solid polymeric thickener, defined hereafter, constitutes a product which can easily be dispersed into water-based systems. A wide variety of surfactants have been found effective. The blended inventive product results in a thickening composition with equal or improved viscosity and thickening properties, while avoiding adverse environmental impacts from vapor emissions of volatile organic carriers and the added costs of transportation of now unnecessary liquids.

2. Description of the Prior Art

It has been known in the art for many years to use various materials as Theological additives to, among other rheological properties, modify the viscosity of aqueous systems. Aqueous systems include both water-based and latex emulsion-based paints and coatings, inks, construction materials, cosmetics, and wood stains. Depending on the composition of the aqueous system, the products made with these thickeners can be useful as decorative coatings, paper coatings for magazines, cosmetics and personal care items, adhesives and sealants, numerous types of inks, oil well drilling fluids, construction compounds including joint compounds, and the like.

Natural, modified-natural and synthetic polymers of various types have been utilized as rheological additives. Natural thickeners include mineral clays, casein, and alginates, including vegetable-based gums, such as guar gum. Modified-natural thickeners include modified products using woody plants as their basis, such as cellulosic products, including methyl cellulose, hydroxyethyl cellulose, hydroxypropyl cellulose, and carboxymethyl cellulose. Such natural and modified-natural products vary widely in their thickening efficiency and their viscosity, flow and leveling modification properties.

Since the 1950s, synthetic polymeric thickeners have assumed increased importance, particularly in the viscosity control of aqueous and latex-emulsion paints and coatings. Synthetic polymeric thickeners are defined to include modified-natural products. Synthetic polymeric thickeners serve several roles in these aqueous systems. When the term, "aqueous systems," is used in this application, it is intended to include latex paints and coatings, as well as latex inks.

In latex and other aqueous paints and coatings, the rheological additive provides improved stability and pigment suspension, and improved use and application properties. In cosmetics and personal care items, such additives improve body, feel, smoothness and silkiness, making the product more aesthetically pleasing and acceptable to sophisticated purchasers. In petroleum drilling fluids, the use of a synthetic thickener improves the suspension of the well-bore cuttings, allows shut-down without fallout of such cuttings, and thereby extends the useful life of the drill head and bit.

Synthetic polymeric Theological thickeners include various acrylic polymers and maleic anhydride copolymers. Two patents issued to Rheox Inc., the assignee of the instant invention, describe a family of solid polyurethane thickening compositions which are today sold under the commercial designation or tradename RHEOLATE. These patents, U.S. Pat. Nos. 4,499,233 and 5,023,309, further describe these synthetic polymeric thickeners as the reaction product of polyisocyanates, polyether polyols and modifying agents (which contain pendant internal hydrophobic groups and at least two active hydrogen moieties) terminated by a chemical capping agent.

Another synthetic polymeric thickener used extensively in commercial paint and coating applications is a low molecular weight polyurethane characterized by hydrophobic groups interconnected by hydrophilic polyether groups, and is disclosed in U.S. Pat. Nos. 4,079,028 and 4,155,892. One similar type of synthetic polymeric thickener is a water-soluble, thermo-plastic organic polymer having a number of monovalent hydrophobic groups incorporated in the internal portion of the polymer molecule. U.S. Pat. Nos. 4,496,708 and 4,426,485, issued to Union Carbide Corporation, describe such thickeners as water-soluble polymers containing pendant internal hydrophobic groups separated from the uncapped end of the polymer by polyether units.

BASF Corporation has been granted a number of patents which disclose polyether Theological additives for aqueous systems obtained by capping a straight-chain polyoxyalkylene compound derived from ethylene oxide and at least one other lower alkylene oxide (a polyoxyalkylene compound initiated with an active hydrogen-containing initiator is disclosed as an example) with an alpha-olefin oxide group. See, for example, U.S. Pat. Nos. 4,288,639, 4,354,956 and 4,904,466. U.S. Pat. Nos. 4,310,436 and 4,709,099 issued to BASF Corporation disclose cross-linked polyesters, polyester-urethanes and polyether-alpha olefins as well as a variety of other types of polymers used as synthetic polymeric thickeners.

Many of the above-described synthetic polymeric rheological additives have often been referred to by the term "associative" rheological additives or thickeners. The mechanism by which such associative thickeners function likely involves "associations" (broadly meaning interactions of some physical or chemical type) between the hydrophobic species in the thickener polymer molecules and other hydrophobic surfaces, either on other thickener polymer molecules, or on molecules in components contained in the system to be thickened. Different commercial types of associative thickeners include polyurethanes, hydrophobically-modified alkali-soluble emulsions, hydrophobically-modified cellulosics, and hydrophobically-modified polyacrylamides.

The molecular weight of these associative thickeners, which also can be referred to as water-soluble synthetic polymers, is sufficiently high enough to impart desired rheological properties to the aqueous composition containing the thickener. Advantageously, the water-soluble polymer operates so that a solution containing up to 2–3 weight percent of the polymer will exhibit a viscosity of at least around 5,000, preferably at least 15,000, and most preferably at least 20,000 centipoises (as measured on a Brookfield viscometer with a number 3 spindle at 10 rpm at 25° C.).

As explained above, a variety of polymeric materials may be used as water-soluble rheological polymers, including cellulose ethers, polyacrylamides, sulfonated polystyrenes, copolymers of acrylic acid, hydroxypropylated guar gum, and the like. The choice of the particular water-soluble polymer depends primarily on the compatibility of such polymer with the other components of the thickening composition that contains the thickener, and the ultimate end use of the aqueous system.

Levels of the rheological thickening polymer additive varying between 0.1% and about 15%, based on the total weight of the system to be thickened, have been found to be useful. As a general class, associative thickeners provide a combination of properties not found in any other single class of known aqueous thickeners. They are generally nonionic, and in many cases are highly efficient viscosity improvers even when they have only middle range molecular weights. They are stable in water, and most are not sensitive to biodegradation.

Associative thickeners can be further defined as molecules containing hydrophobic moieties localized or dispersed through a hydrophilic backbone. The hydrophobic parts cause the association, either with themselves or by association with hydrophobic moieties contained in the various ingredients commonly found in aqueous paints, coatings, and inks. Typical polymer backbones include polyurethanes, polyethers and starch-type molecules. They are versatile in that they both thicken virtually unlimited types of aqueous systems, and also impart many beneficial auxiliary properties. For instance, as additives to textile binder compositions, they may soften rather than harden the fabric. In latex paints they not only thicken but also provide superior flow and leveling properties, and give excellent viscosity control under both low and high shear conditions.

Improvement in flow or leveling as compared to many prior art products, usually accompanied by an increase in viscosity, is observed when the appropriate additive, selected from those described herein, is dispersed in either aqueous or latex systems, or in unpigmented lattices. The beneficial effects are most visible in coating compositions of relatively low pigmentation, or where pigmentation is absent altogether. Such additives often find the widest use in fairly expensive gloss or semi-gloss latex paint compositions.

Water-soluble thickeners for aqueous systems are prepared and have been sold and used in a dry, solid form; a powder form is most common. The dust associated with the incorporation of dry polymers in the industrial environment presents similar conventional material handling problems as are encountered with other types of dry particulates. When added to aqueous systems, moreover, solid powder polymers tend to agglomerate to form clumps. Agglomeration can be reduced in many cases by adding the solid polymer to the aqueous system slowly with agitation. In other cases, the solid thickener is first dispensed in water to form a water/polymer mixture, and then the dispersion is "let down" into the aqueous system to be thickened. Such slow dissolution, however, can affect the efficiency of specific manufacturing operations.

Solid water-soluble polymers have proved particularly difficult to incorporate in industrial paint-making processes, because they often require long periods of time to dissolve. Both in simple aqueous solutions and, more particularly, in formulations comprising other chemicals and ingredients, extended agitation and aging periods are necessary before proper viscosity and dispersion is attained. For the above reasons, manufacturers have searched for a simple, fast and effective way of mixing solid water-soluble polymers into their aqueous systems. Because of this search, many commercial associative thickeners are today sold as pourable liquid "concentrates." Such commercial concentrates, in liquid form for latex paint and other compositions, usually involve taking the solid polymer and preparing a thickening mixture as a blend of water and a water-miscible organic solvent, such as diethylene glycol monobutyl ether (also known as butyl carbitol) or ethylene or propylene glycol. The addition of this organic co-solvent lowers the viscosity of the polymer in water to provide ease in handling, and allows an efficient level of activity in the final product. The water-miscible solvent selected for such commercial compositions has, up to this time, almost exclusively been an organic solvent. For example, commercial polymeric rheological additives for water-borne paint systems, designated Rheox RHEOLATE 255, 278, and 300, are currently sold as liquids in a thickener/butyl carbitol/water mixture.

Although "liquid" rheological additives are used at relatively low levels, as noted above, the use of a volatile organic co-solvent in such rheological additives contributes to the Volatile Organic Content, designated VOC, of the aqueous system to be thickened. The reduction of the VOC of water-borne systems, including important paint and construction systems, without adversely affecting the other properties of the systems, is currently a very active research topic throughout the world, particularly in the United States.

The aforementioned Union Carbide patent, U.S. Pat. No. 4,426,485 describes a solvent/water mixture for a polymer thickening composition of appropriate amounts of polymer, the organic solvent diethylene glycol monobutyl ether, and water. This type of organic solvent evaporates after paints or coatings containing it are applied, and enters the atmosphere during the drying of such aqueous compositions. Similar evaporation occurs following the application of inks, joint compounds and sealants, among other thickened substances.

It has become increasingly important in combating atmospheric pollution to remove organic contaminants, including the vapors released in the course of industrial and architectural painting and in the manufacture of painted and coated articles, such as for example, automobiles and furniture. Such organic vapors not only have an offensive odor, but they may also cause damage to vegetation, wildlife and other aspects of the external environment, besides constituting a health hazard. The authorities in many countries, including the United States and Western Europe, have increasingly imposed ever-lower tolerances as to venting such vapors to the atmosphere.

U.S. Pat. No. 5,425,806, recently issued to Rheox Inc., assignee herein, describes a liquid rheological composition containing an associative thickener and water where butyl carbitol has been replaced with a surfactant to form the liquid pourable additive composition. The patent specification of U.S. Pat. No. 5,137,571, recently issued to Rohm & Haas Corp., exhibits some understanding of the environmental problems which liquid associative thickening compositions can cause. However, the patent continues the practice of mixing a solid polymer into a liquid medium to form a liquid pourable composition. The patent describes the use of starch derivatives of cyclodextrin to suppress the viscosity of an associative thickener in water and create a liquid composition product The cyclodextrin is absorbed onto the hydrophobic moieties of associative thickeners.

U.S. Pat. No. 4,722,962, issued to DeSoto Inc., refers to nonionic surfactants in relation to associative thickeners, but teaches reacting such surfactants into the thickener polymer to form a portion of the final polyurethane. U.S. Pat. No. 5,109,061 describes a surfactant composition comprising a water-soluble polyurethane or polyurea dispersed in a surfactant The composition is prepared by reacting an aromatic or aliphatic polyisocyanate with a polyol or polyamine in the presence of a surfactant, broadly defined as anionic, nonionic, ampholytic, zwitterionic and cationic surfactants. The composition products are disclosed as suitable for preparing molded or shaped articles such as bathtub toys. U.S. Pat. No. 5,270,378 shows acrylic surfactants and compositions (such as graphics systems, including printing plates and imageable polymerizable systems) containing these surfactants. The compositions, in addition, comprise organic solvents.

U.S. Pat. No. 4,432,881 describes thickening agents useful for drilling mud formulations and fracturing fluids containing water-dispersible polyacrylamide and other polymers having pendant hydrophobic groups, as well as cationic and nonionic surfactants, dispersed in an aqueous medium or solution. The hydrophobic groups of the polymer are described as solvated by the surfactant such that the thickening agent forms a solution in water when the two components are agitated with deionized water over a period of time.

Australian Patent No. 515,783, which has no United States counterpart, discloses a thickener concentrate composition which is a mixture of two thickeners, one a nonionic polyurethane and the other a surfactant co-thickener, a non-aqueous inert organic diluent, and from 0 to 65% by weight of water. The surfactant co-thickener is used to increase the viscosity of the print paste into which the concentrate is dispersed. The thickener composition is described as a clear concentrate, and is contrasted with powder thickeners which require subsequent further dilution. The clear concentrates are disclosed as having low manageable viscosity.

OBJECT OF THE INVENTION

Rheox, Inc., the assignee of the instant invention, sells synthetic polymers in a line of 100% active, powdered polyurethane associative thickeners. Along with the obvious savings that are realized in shipping a 100% active Theological additive, such products have the added advantage of being VOC-free. There is, however, considerable difficulty in dispersing these solid synthetic polymeric-thickeners directly into water or latex paint formulations. When dispersed directly into latex, for example, there is an "uneven wetting out" of the product that results in the formation of lumps or globules whose core is still the dry, powdered polymer. This problem can be partially overcome in latex paints by either adding the additive to the "grind" of the paint, or by first dispersing the additive in ethylene glycol and adding this mixture directly to the "letdown" of the paint. This second option, unfortunately, negates what is one of this product line's biggest technological advantages, i..e. the fact that the additives are VOC-free, because glycols are not commonly present in VOC-free paint formulations. The addition of associative thickeners into an aqueous system already containing surfactants, or with the simultaneous separate addition of surfactants and thickener, has not remedied the above-described known defects. A solid, "super-dispersible," product which can be added directly to the paint would fill an important market need.

Accordingly, it is an object of the present invention to solve or substantially alleviate the problems created by solid synthetic polymeric thickeners in thickening compositions for aqueous systems. It is, therefore, a more specific object of the present invention to provide a mixture of a surfactant and an associative thickener as a substantially anhydrous composition which is useful for increasing the viscosity of a water-based system in an improved efficient manner, more easily and without the environmental problems associated with current dispersible organic solvent-containing liquid products.

It is another object of the present invention to provide a thickening mixture containing a solid synthetic polymeric thickener and defined surfactants which improve the dispersibility of the polymer into aqueous systems where it is used to provide rheological properties.

DETAILED DESCRIPTION OF THE INVENTION

The substantially anhydrous thickening composition of this invention is a mixture comprising:

(a) From about 50 to about 85% of a solid synthetic polymeric thickener including, for example, polyurethane associative thickeners; and (b) From about 15 to about 50% of one or more anionic, cationic and nonionic surfactants.

The relative amounts of each of the above chemicals in the thickening composition can vary over wide ranges, with an effective range of about 50–85% by weight polymeric thickening compound to 15–50% by weight surfactant preferred and an amount of surfactant of about 30% most preferred. Weight percentages are relative to the two materials, one to the other. It should be understood that the term solid includes powder and powder-like states. It is preferred that both the polymeric thickener and the surfactant used be in a solid or powder form. It is also to be understood that additional additives may be added to the thickening composition, in diminished amounts as compared to those presently commonly used, preferably to be less than 30% of the amount of surfactant utilized. Other ingredients known in the art other than water may be added to the inventive thickening compositions and include inorganic salts, liquid and solid fillers, chelating agents, buffering agents, clays, pH adjusting agents, neutralization chemicals, and the like. The composition results in a product that can be easily dispersed into latex paints, sealants, inks, caulks and coating composition.

The elimination of water from the inventive composition reduces the risks of bacterial and fungus contamination of the product, and systems in which it is used, and reduces or eliminates the need for biocidal additives. In addition, water causes such compositions to become sticky and tacky, and less easy to handle and disperse. Substantially anhydrous means less than about 0.1–0.2% of water by weight of the entire composition.

Synthetic polymeric thickeners of all the types previously discussed are useful for the invention. Particularly preferred are commercial polyurethane thickeners sold by Rheox Inc. under the trade names Rheolate 204, 205 and 208 and similar solid or powder thickeners sold by, for example, Rohm & Haas Company, Union Carbide Corporation, BASF Corporation, Hoechst (Germany) and Bayer GmbH.

The type of surfactants utilized in this invention are anionic, cationic, and non-ionic surfactants of the type described below, which at ambient temperature, exist in solid, semi-solid or liquid form. In a preferred embodiment, the surfactant used is made into powder by grinding, pulverizing or similar processing:

A. Anionic surfactants, are characterized by an amphipathic molecular structure composed of groups of opposing solubility tendencies, typically an oil-soluble hydrocarbon chain and a water-soluble ionic group. The presence of two structurally dissimilar groups within a single molecule is the most fundamental characteristic of anionic surfactants. Such surfactants generally carry a negative charge on the surfactant's hydrophilic portion. The surfactant's actual behavior, i.e. the activity of the surfactant molecule, is determined among other things by the make-up of the individual groups, the solubility properties of the entire molecule, its relative size, and the location of the hydrophilic groups within the surfactant molecule.

Anionic surfactants useful in this invention are surfactants characterized by having carboxylates, sulfonates, sulfates, or phosphates as their hydrophilic, solubilizing group. These groups are preferably combined with a carbon-chain hydrophobe (8–16 carbons is most preferred) for best surfactant properties.

Representative anionic surfactants for use with associative thickeners in the invention include: sulfonic acids, sulfonates, alkyl sulfates, alkyl ether sulfates, sulfosuccinates and sulfosuccinamates, phosphate esters, carboxylated alcohol ethoxylates and sodium, lithium, potassium, and ammonium salts of the above surfactants. Particularly preferred are: sulfates, sulfonates and sulfosuccinates including their salts. Commercial products useful in the invention include Aerosol AY-B, an 85:15 blend of sodium diamyl sulfosuccinate and sodium benzoate, and Monawet MB-100, a sodium diisobutyl sulfosuccinate.

B. Nonionic surfactants carry no discrete charge when dissolved in aqueous media The solubilizing groups in this type of surfactant are usually ethylene oxide chains and hydroxyl groups. Hydrophilicity in nonionic surfactants is provided by hydrogen bonding with water molecules. Oxygen atoms and hydroxyl groups readily form strong hydrogen bonds, whereas ester groups form hydrogen bonds less readily. Hydrogen bonding provides solubilization in neutral and alkaline media. In a strongly acid environment, oxygen atoms are protonated, providing a quasi-cationic character. Each oxygen atom makes a small contribution to water solubility. More than a single oxygen atom is therefore needed to solubilize a nonionic surfactant in water. Nonionic surfactants are compatible with ionic and amphoteric surfactants. Non-ionic surfactant include: ethoxylated alkylphenols/alcohols/amines/ fatty acids/and/or amides, amine oxides, fatty acid esters, polysiloxane derivatives, sucrose and glucose esters, and sorbitan derivatives.

Particularly effective solid nonionic surfactants useable in the present invention are: ethoxylated alkyl phenols.

C. Cationic surfactants generally carry a positive charge on the surfactant's hydrophilic portion usually on a nitrogen atom in the form of a quaternary ammonium compound with a group of 12–24 carbon atoms attached to the nitrogen. Cationic surfactants are primarily used as textile softeners, corrosion inhibitors, germicides and ingredients in personal care products. Cationic surfactants also include fatty amines including ethoxylated fatty amines, fatty imidazolines and amine oxides. Quaternary compounds include benzyl methyl dihydrogenated tallow ammonium chloride, dimethyl dicoco ammonium chloride, and dimethyl dihydrogenated tallow ammonium chloride. Particularly effective surfactants include: EMCOL CC-9, a polypropoxy quatemary ammonium chloride.

There are a number of ways to prepare the inventive anhydrous thickening composition. The thickening composition of the present invention is prepared most preferably by adding the thickening polymer to the described surfactant and intimately mixing the two chemicals in a mixing apparatus useful for mixing chemicals such as a PK blender. The composition can also be made by adding the surfactant at various stages in the manufacture of the polymer thickener including during late stages of its polymerization. The surfactant can also be added to the polymer thickener in solution and the solution dried to form a solid powder. In some cases, use of a liquid surfactant can result in a liquid thickening composition. The mixture of the above chemicals can be accomplished utilizing similar machinery presently used to prepare mixtures of solid products. While the relative amounts may vary, in general, the synthetic thickener will normally make up more than 50% of the amount of the thickening composition or mixture. The relative amounts of polymer and surfactant can effectively vary in a wide range in producing compositions according to the invention with economic conditions, to some extent, dictating the amount of surfactant used. A preferred range for the relative amounts in the inventive composition is about 60–85% associative thickener polymer, to about 15–40% surfactant. The preferred amount is that amount necessary to impart rapid water dissolution to the thickening polymer.

Use of the thickening composition of the invention is similar to the use of present, commercial, solid synthetic polymers, and should in general require no special arrangements or apparatus when incorporating such compositions into aqueous systems. Typical use levels are 0.25% to 20% of the thickening mixture composition to the system, the percent being based on the system to be thickened, with a range of 0.25% to 3.0–4.0% being most preferred. The thickening composition can easily be mixed into the aqueous system using conventional mixing equipment such as sand mills, medium and high speed dispersing machinery, paddle mixers, pebble mills, ball mills, and similar mixing equipment. Substantially less time and shear effort will be necessary to obtain effective dispersion compared to present-day solid thickeners.

In a preferred embodiment, blending or mixing a solid powdered surfactant of the above type with solid powdered polymeric thickeners results in a product that is easily dispersed in water or latex. This mixture composition can be added directly to a paint masterbatch (with or without water) using appropriate mixers or common apparatus found in most manufacturer's plants. As an alternative, the dry inventive composition can be added to portion of the paint formula at a level of 10–80% solids, mixed into a solution and added as a liquid to the remainder of the paint formula Neither of these thickening steps leads to a loss in efficiency.

The following examples are illustrations designed to assist those skilled in the art to practice the present invention, but are not intended to limit the invention. Changes can be made without departing from the spirit of the invention. The various chemicals used in the examples were commercially obtained materials.

EXAMPLES

Example 1

This example is used to show the effectiveness of surfactants to aid in the dispersing and solubilizing of powdered, solid polyurethane associative thickeners in water. A number of polyurethane associative thickeners were prepared using standard polymerization techniques known to the art. Three such polymers in powder form, designated polymers A, B and C, had the following compositions:

Polymer A

Polyurethane reaction product of poly(ethylene glycol), an aliphatic diisocyanate, a blend of fatty diamines, and a blend of fatty alcohols.

Polymer B

Polyurethane reaction product of poly(ethylene glycol), an aliphatic diisocyanate, a single fatty diamine, and a blend of fatty alcohols.

Polymer C

Polyurethane reaction product of poly(ethylene glycol), a branched chain aliphatic diisocyanate, a single fatty diamine, and a fatty amine.

The above polymers were then mixed for about 60 minutes with a powdered anionic surfactant. A pass/fail screening test was developed to determine if a particular polymer/surfactant combination would easily disperse or solubilize in a pure water system—such a system is representative of an aqueous system generally. 90 g of deionized water were weighted into an 8 oz. jar and 10 g of the sample, comprised of 10 parts of polymer and 3 parts of surfactant, was weighted into a paper cup. The jar containing the water was placed on a lab mixer equipped with a propeller blade, with the blade placed about 0.5 inch from the bottom of the jar. The mixer was set at 250 rpm, the sample added to the water all at once and mixed a total of 5 minutes. The sample was removed from the mixer and rated pass or fail.

| | |
|---|---|
| Pass | smooth, homogeneous liquid, clear to creamy white color no dry powder on the water surface, sides of the jar or shaft and blades of the mixer no lumps or gel pockets |
| Fail | gelatinous lump of polymer attached to mixer blades, lumps of polymer or gel pockets throughout water, dry powder on the water surface or sides of jar. |

When a particular polymer/surfactant combination was found to pass the above test, it was then dispersed in a paint masterbatch. The paint screening test consisted of adding the appropriate amount of the anhydrous thickening composition to a half-pint masterbatch sample of first, a purely aqueous system and second, a commercial latex paint. The system and thickening composition was then mixed for 10 minutes with a Cowles dispersator. Both initial and overnight Stormer and ICI viscosities of the systems were measured.

Run to Determine Lower Range

A test was run to determine a lower limit to the amount of surfactant necessary for the invention. This test constituted a ladder study of the amount of surfactant/solubilizer in the final product to determine if the amount of surfactant could be lowered without hurting the dispersibility and other properties of the current invention. The surfactant used in this test was Aerosol AY-B, an anionic diamyl sulfosuccinate, with Polymer A. The test results presented in Table I give the results of the pass/fail test in a purely aqueous system along with the initial and overnight viscosity results in the latex paint system described in Table 3.

TABLE I

| Sample | % Polymer A/ % Aerosol AY-B | Aqueous Pass/Fail | Initial Paint Viscosity KU/ICI | Overnight Paint Viscosity KU/ICI |
|---|---|---|---|---|
| A | 93% Polymer A/ 7% Aerosol AY-B | Fail | Not dispersed, lumps | |
| B | 86% Polymer A/ 14% Aerosol AY-B | Fail | Not completely dispersed, small lumps | |
| C | 81% Polymer A/ 19% Aerosol AY-B | Pass | 90/1.0 | 92/1.1 |
| D | 77% Polymer A/ 23% Aerosol AY-B | Pass | 89/1.1 | 89/1.1 |
| E | 100% Polymer A | Fail | Not dispersed, lumps | |

The above results show that a lower limit of about 15% surfactant is necessary to achieve the beneficial effects of the invention. The above results also show that, once the lower limit of surfactant in the invention is reached, increasing the amount of surfactant in the product does not detract from the performance of the associative thickener in a water-based latex paint.

Tests run with various surfactants and polymers

Tests were then run, using the above described techniques using an anhydrous blend of polymers A, B and C and various additional surfactants in powder form at a loading of 23% with the result of the pass/fail test in a purely aqueous system given in Table 2 and in a latex paint in Table 4.

TABLE 2

| Sample | Polymer/Surfactant | Pass/Fail |
|---|---|---|
| 1 | Polymer A/Aerosol AY-B* | Pass |
| 2 | Polymer C/Aerosol AY-B | Pass |
| 3 | Polymer A/Monawet MB-100 | Pass |
| 4 | Polymer B/Monawet MB-100 | Pass |
| 5 | Polymer C/Witconate LX | Pass |
| 6 | Polymer C/Nacconal 90G | Pass |
| 7 | Polymer C/Witconate K | Pass |
| 8 | Polymer A/Dowfax 3B2-D | Pass |
| 9 | Polymer A/XU 40333.00 | Pass |
| 10 | Polymer A/No surfactant | Fail |
| 11 | Polymer B/No surfactant | Fail |
| 12 | Polymer C/No surfactant | Fail |

* Aerosol AY-B Sodium diamyl sulfosuccinate; CYTEC, Inc.
Monawet MB-100: Sodium diisobutyl sulfosuccinate; Mona Industries, Inc.
Witconate LX: Sodium alkylaryl sulfonate; Witco Corp.
Nacconal 90G: Linear alkybenzene sulfonate; Stepan Co.
Witconate K: Dodecylbenzene sulfonate, sodium salt; Witco Corp.
Dowfax 3B2-D: Decyl (sulfophenoxy) benzenesulfonic acid, disodium salt; Dow Chemical Co.
XU 40333.00: Benzene, 1,1-oxybis-tetrapropylene derivatives, sodium salt, Dow Chemical Co.

Example 3

This example demonstrates the ability of the thickening composition of the invention to thicken latex paints. The paint formula is given in Table 3 below.

TABLE 3

| Ingredients | Pounds |
| --- | --- |
| Propylene glycol | 29.92 |
| Tamol 681 (35%; dispersant) | 29.92 |
| Ammonium hydroxide (28%) | 0.83 |
| Foamaster AP (defoamer) | 1.66 |
| Water | 10.39 |
| Kronos 2310 (Titanium dioxide) | 213.56 |
| Water | 10.30 |
| Disperse at high speed for 15 min. and add: | |
| Water | 66.27 |
| Butyl Carbitol | 34.90 |
| Rhoplex HG-74 (Acrylic latex) | 558.42 |
| Texanol | 34.90 |
| Foamaster AP | 1.66 |
| Ammonium hydroxide (28%) | 1.25 |
| Inventive composition | 16.00 |

The Stormer and ICI viscosities of the samples are reported in Table 4.

TABLE 4

| Sample | Composition | Initial Viscosity KU/ICI | Overnight Viscosity KU/ICI |
| --- | --- | --- | --- |
| 13 | Polymer A/Aerosol AY-B | 90/1.3 | 90/1.2 |
| 14 | Polymer C/Aerosol AY-B | 88/1.3 | 88/1.3 |
| 15 | Polymer A/Monawet MB-100 | 91/1.2 | 90/1.3 |
| 16 | Polymer B/Monawet MB-100 | 99/1.1 | 118/1.1 |
| 17 | Polymer C/Witconate LX | 86/1.0 | 85/1.3 |
| 18 | Polymer C/Nacconal 90G | 88/1.0 | 87/1.2 |
| 19 | Polymer C/Witconate K | 84/1.2 | 87/1.2 |
| 20 | Polymer A/Dowfax 3B2-D | 90/1.2 | 90/1.2 |
| 21 | Polymer A/XU 40333.00 | 93/1.0 | 92/1.3 |
| 22 | 25% Polymer A/15% Butyl Carbitol/60% Water | 94/1.2 | 92/1.3 |
| 23 | 25% Polymer B/15% Butyl Carbitol/60% Water | 120/1.0 | 120/1.2 |
| 24 | 25% Polymer C/15% Butyl Carbitol/60% Water | 89/1.2 | 89/1.3 |
| 25 | Polymer A | Not dispersed, lumps | |
| 26 | Polymer B | Not dispersed, lumps | |
| 27 | Polymer C | Not dispersed, lumps | |

The above results demonstrate the ability of various surfactants to aid in the dispersability of solid, powdered associative thickening compositions for water-based systems including latex paints. The fact that the initial paint viscosities, taken one hour after the thickener was incorporated into the paint system, are equal to the overnight paint viscosities demonstrates the ability of the surfactants to immediately disperse and solubilize the associative thickener. The above results also show that the surfactant does not detract from the thickening power of the additive because the polymer/surfactant samples are equal in viscosity to their polymer/butyl carbitol/water couterparts.

Example 4

An experiment was conducted to prepare a mixture of a polymer thickener and a surfactant in solution with water, and after drying, to test the dried product for ease of dispersibility.

150 g of a mixture of Polymer A and surfactant Aerosol AY40, a sodium diamyl sulfosucinate at 40% activity obtained from Cytec, Inc., was dried overnight at 55° C. in a vacuum oven. The dried sheet was broken up and milled with liquid $N_2$ through a Brinkman mill without a screen. Fine particles of the material were placed in $H_2O$ at 20% polymer concentration and the dried material completely dispersed quickly and easily.

A second method of mixing a liquid surfactant with the dry polymer product involved dispersing both the polymer and surfactant in a suitable solvent and, after mixing, removing the solvent to leave a solid, anhydrous product. 50 g of Polymer A and 15 g of surfactant were added to 150 g methanol, mixed, and dried under vacuum; the dried polymer/surfactant was then milled through a Brinkman Mill to yield a dry, powdered product. The dried product was put through the pass/fail test in water and passed, and the paint viscosities in the paint formula of Table 3 are given below in Table 5:

TABLE 5

| Sample | Composition | Initial Viscosity KU/ICI | Overnight Viscosity KU/ICI |
| --- | --- | --- | --- |
| 28 | Polymer A/Triton X-100* | 90/0.8 | 92/1.2 |
| 29 | Polymer A/Emcol CC-9* | 89/0.8 | 84/1.2 |
| 30 | Polymer A/Polypropylene Glycol | 87/0.8 | 87/1.1 |

* Triton X-100: Alkylaryl polyether alcohol, a nonionic surfactant; Union Carbide Chemicals and Plastics Co.; Emcol CC-9:Polypropoxy quaternary ammonium chloride, a cationic surfactant; Witco Corp.

The above results demonstrate the ability to use liquid surfactants in the current invention and then remove any liquid or solvent used to make the product to yield a dry, powder product. The above results also demonstrate that making the product in this manner does not detract from its effectiveness in thickening a water-based latex paint.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A substantially anhydrous solid thickening composition for aqueous systems comprising:

a) from about 50 to 85% by weight of a solid polyurethane associative thickener characterized by hydrophobic groups interconnected by hydrophilic groups and having a molecular weight of 2500 or greater; and b) from about 15 to 50% by weight of one or more solid anionic surfactants selected from the group consisting of sulfates, sulfonates, sulfosuccinates, and salts thereof.

2. The composition of claim 1, wherein the amount of surfactant in the composition is 15% to less than 30% by weight.

3. The composition of claim 1, comprising one or more additional components selected from the group consisting of fillers, clays, neutralization chemicals and buffering agents.

4. The composition of claim 1, wherein the amount of the solid anionic surfactant in the composition is 15% to less than 25% by weight.

5. The composition of claim 1, wherein the solid anionic surfactant is selected from the group consisting of dialkyl sulfosuccinates, alkyl sulfates, alpha olefin sulfonates and sulfates of ethoxylated alcohols.

6. An improved method of increasing the viscosity and leveling characteristics of an aqueous system comprising mixing into the aqueous system from about 0.25% to about 20% by weight of a substantially anhydrous solid thickening composition comprising:
  a) from about 50 to 85% by weight of a solid associative polyurethane thickener characterized by hydrophobic groups interconnected by hydrophilic groups and having a molecular weight of 2500 or greater; and
  b) from about 15 to 50% by weight of one or more solid anionic surfactants selected from the group consisting of sulfates, sulfonates, sulfosuccinates, and salts thereof.

7. The method of claim 6 wherein the aqueous system is latex paint.

8. The method of claim 6 wherein the solid anionic surfactant is selected from the group consisting of dialkyl sulfosuccinates, alkyl sulfates, alpha olefin sulfonates and sulfates of ethoxylated alcohols.

9. The method of claim 6 wherein the solid surfactant is in powder form.

* * * * *